United States Patent
Almstaetter et al.

(10) Patent No.: US 9,902,376 B2
(45) Date of Patent: Feb. 27, 2018

(54) CONTROL OF A PARKING BRAKE

(71) Applicant: Bayerische Motoren Werke Aktiengesellschaft, Munich (DE)

(72) Inventors: Martin Almstaetter, Puchheim (DE); Roman Thein, Munich (DE); Martin Berndaner, Ohlstadt (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 148 days.

(21) Appl. No.: 14/669,193

(22) Filed: Mar. 26, 2015

(65) Prior Publication Data

US 2015/0197223 A1  Jul. 16, 2015

Related U.S. Application Data

(63) Continuation of application No. PCT/EP2013/069907, filed on Sep. 25, 2013.

(30) Foreign Application Priority Data

Sep. 27, 2012  (DE) .......................... 10 2012 217 542

(51) Int. Cl.
*B60T 7/08* (2006.01)
*B60T 13/66* (2006.01)
(Continued)

(52) U.S. Cl.
CPC ............. *B60T 7/085* (2013.01); *B60R 25/08* (2013.01); *B60R 25/30* (2013.01); *B60T 13/66* (2013.01); *B60T 13/662* (2013.01); *B60T 17/22* (2013.01)

(58) Field of Classification Search
None
See application file for complete search history.

(56) References Cited

U.S. PATENT DOCUMENTS

2007/0225890 A1 *   9/2007   Ringlstetter ............ B60T 7/085
                                                        701/70
2008/0090702 A1    4/2008   Hopf et al.
(Continued)

FOREIGN PATENT DOCUMENTS

DE          100 25 731 A1   12/2000
DE    10 2007 036 260 A1    2/2009
(Continued)

OTHER PUBLICATIONS

English translation of DE102010063372 from EPO.*
(Continued)

*Primary Examiner* — Rami Khatib
*Assistant Examiner* — Nicholas K Wiltey
(74) *Attorney, Agent, or Firm* — Crowell & Moring LLP

(57) ABSTRACT

A method is disclosed for operating a parking brake by a driver of a vehicle, wherein the parking brake is operated by a switching key, which is designed for taking up at least two and, in particular, three states. The method detects the state of the switching key; codes the detected state; generates a check word for the coded state by use of a cyclic redundancy check; creates a message suitable for the transmission by way of a single-wire channel, the message including the coded state and the check word; and sends the message by way of the single-wire channel.

13 Claims, 1 Drawing Sheet

(51) Int. Cl.
*B60T 17/22* (2006.01)
*B60R 25/08* (2006.01)
*B60R 25/30* (2013.01)

(56) References Cited

U.S. PATENT DOCUMENTS

| | | | |
|---|---|---|---|
| 2010/0030444 A1* | 2/2010 | Roll | B60T 8/1766 |
| | | | 701/80 |
| 2011/0112774 A1* | 5/2011 | Gilles | B60T 8/4059 |
| | | | 702/50 |
| 2011/0285201 A1* | 11/2011 | Peuser | B60R 16/03 |
| | | | 307/10.1 |
| 2012/0006634 A1 | 1/2012 | Bensch et al. | |
| 2012/0134363 A1* | 5/2012 | Little | H04L 67/02 |
| | | | 370/400 |

FOREIGN PATENT DOCUMENTS

| | | |
|---|---|---|
| DE | 10 2007 046 354 A1 | 4/2009 |
| DE | 10 2008 015 910 A1 | 10/2009 |
| DE | 10 2008 064 077 A1 | 7/2010 |
| DE | 10 2010 063 372 A1 | 6/2012 |
| WO | WO 2005/113305 A1 | 12/2005 |
| WO | WO 2011/039556 A1 | 4/2011 |

OTHER PUBLICATIONS

International Search Report (PCT/ISA/210) dated Mar. 13, 2014, with English translation (Six (6) pages).
German Search Report dated May 27, 2013, with English translation (Nine (9) pages).

* cited by examiner

CONTROL OF A PARKING BRAKE

CROSS REFERENCE TO RELATED APPLICATIONS

This application is a continuation of PCT International Application No. PCT/EP2013/069907, filed Sep. 25, 2013, which claims priority under 35 U.S.C. § 119 from German Patent Application No. 10 2012 217 542.3, filed Sep. 27, 2012, the entire disclosures of which are herein expressly incorporated by reference.

BACKGROUND AND SUMMARY OF THE INVENTION

The invention relates to a method of operating a parking brake by a driver of a vehicle and to a method of triggering a parking brake of a vehicle according to the operation of a switching key by the driver of the vehicle, as well as to corresponding devices.

Parking brakes can nowadays be operated by way of switching keys, which comprise a mechanically movable part that can take up various positions, here also called states. Similar to a switch, different circuits are opened or closed in the different states, which informs a control unit of the state of the switching key. Simultaneously, such a switching key may also include a simple status display, for example, in the form of an LED.

However, several lines are required for connecting such a switching key to a control unit, among them, those used for the verification of the state of the switching key detected by means of another line and those for driving the status display. In a digital implementation, for example, four (4) lines are used; in an analog implementation, even five (5) lines are used for connecting the switching key.

Some switching keys for operating a parking brake allow additional functions. However, these additional possibilities also require that the switching key be connected to the control unit by way of further lines. Switching keys of this type have been installed with up to eleven lines.

The large number of switching key lines results in high costs and additional weight in the wiring harness of a vehicle. Moreover, in the event of a fault and an analogous switching key evaluation, it is often not clear whether the fault was caused by the switching key itself, the wiring harness or the control unit.

It is an object of the invention to reduce the number of switching key lines and simultaneously detect transmission faults.

This and other objects are achieved by a method of operating a parking brake by a driver of a vehicle, wherein the parking brake is operated via a switching key, which is configured to take up at least two and, in particular, three states. The method detects the state of the switching key; codes the detected state; generates a check word for the coded state with the aid of a cyclic redundancy check; creates a message suitable for the transmission by way of a single-wire channel, the message comprising the coded state and the check word; and sends the message by way of a single-wire channel. A single wire channel may be a line having one wire or a twisted wire for the transmission.

In this manner, the transmission by way of one line becomes possible, which permits a significant saving of lines and thereby saves costs and weight. This is significant, specifically in the case of a vehicle. By the use of a check word with a cyclic redundancy check (CRC), faults in the transmission can be avoided or recognized. The use of the check word permits the saving of verification lines.

In an advantageous further development, the message is created in response to a query. The electronic system, which implements the introduced method can thereby be kept simple and therefore consumes little energy. A partial switching-off of the electronic system can simultaneously take place as long as no query is arriving, which also saves energy.

In a preferred further development, the message for the transmission is created according to a Local Interconnect Network (LIN) specification or a protocol specification derived therefrom, the check word being transmitted in the user data of the message. The message is thereby exchanged between two participants according to the LIN protocol. The LIN specification is provided by the Local Interconnect Network consortium. In this context, user data are data which are not defined by the LIN and are generated by the applications.

It is a further advantage of this further development that data can also be transmitted to the switching key, particularly by way of a message of the LIN protocol. When the switching key comprises a status display (status LED) and/or a background illumination (for example, by another LED), its/their triggering can take place by way of the transmitted data.

Furthermore, the coded state transmitted in a message of the LIN can be transmitted while being secured by a check word, although the LIN specification provides no checking and securing by a CRC.

In a further development, the method also includes the detection of a malfunction of: the switching key, a detector that detects the state of the switching key, or the electronic processing unit for implementing parts of the method, and the sending of a fault report, particularly by way of a message according to the LIN protocol. When a fault of the overall system occurs, the analysis of the cause of the fault will be simplified in this manner because the source of the fault was determined and transmitted.

According to another aspect, a device for operating a parking brake by a driver of a vehicle comprises: a switching key, which can take up at least two and, in particular, three states; a detector that detects the state of the switching key; an electronic processing unit configured to carry out one of the above-mentioned methods. It may be provided that the switching key includes a status display (LED). By means of this device, the disclosed method with its advantages can be implemented.

According to a second aspect, a method is provided for triggering a parking brake of a vehicle according to the operation of a switching key by the driver of the vehicle, wherein the switching key can take up at least two and, in particular, three states. The method receives a message by way of a single-wire channel, wherein the message contains a check word and a coded state of the switching key, the check word having been created by means of a cyclic redundancy check. The method further checks the coded state for transmission faults by way of the check word according to a cyclic redundancy check. If the check detects no transmission faults, the method outputs an instruction for activating the parking brake, if a coded state of the switching key is received which indicates that the parking brake is to be activated. A single-wire channel may be a line having a wire or a twisted wire for the transmission.

In this manner, a transmission by way of one line is made possible, which results in a significant saving of lines and therefore saves costs and weight. This is significant, specifically in the case of a vehicle. By the use of a check word with a cyclic redundancy check, faults in the transmission can be avoided or recognized. The use of the check word permits the saving of verification lines.

In an advantageous further development, the method includes the sending of a query concerning the state of the switching key, the message being received in response to a previously sent query. This makes it possible that the electronic system at the switching key, thus the detector that detects the state of the switching key, which the introduced method implements, can be kept simple and therefore consumes little energy. Simultaneously, a partial switching-off of the electronic system is contemplated as long as no query is arriving. This can also save energy.

In a preferred further development, the message is constructed according to a Local Interconnect Network (LIN) specification or a protocol specification derived therefrom, the check word being included in the user data of the message. The message is therefore exchanged between two participants according to the LIN protocol. The LIN specification is provided by the Local Interconnect Network consortium. It is a further advantage of this further development that data can also be transmitted to the switching key. When the switching key includes a status display (status LED), the latter can be triggered by way of these transmitted data. Furthermore, the coded state transmitted in a message of the LIN can be transmitted in a secured manner by use of a check word, although the LIN specification provides no checking and securing by a CRC.

In an implementation of the method, this method further comprises: sending of two queries concerning the state of the switching key, a sufficiently long time period existing between the queries, during which the receipt of a response message can be expected; determining that no message was received in the time period between the queries and in a second time period after the last query, in which the receipt of a message can be expected; in response to the determination: Writing of a corresponding fault report into the fault memory. In this manner, the proper functioning of the normally responding system at the switching key will be checked. Specifically, if this system does not respond within the expected time, a malfunction will be assumed.

Furthermore, another development provides the receiving of a message, particularly according to the LIN protocol, which indicates a malfunction of: the switching key, the detector that detects the state of the switching key, or the electronic processing unit arranged comparatively close to the switching key. This malfunction or message is stored in a fault memory. When a fault of the overall system occurs, the analysis of the cause of the fault will be simplified in this manner because the source of the fault was determined and transmitted.

A device is further disclosed for triggering a parking brake of a vehicle according to the operation of a switching key by a driver of a vehicle, the switching key being able to take up at least two and, in particular, three states. The device comprises a receiver for receiving a message by way of a single-wire channel; a fault memory; an electronic processing unit configured to carry out a method according to the second aspect or a displayed modification thereof. By means of this device, the disclosed method can be implemented according to the second aspect with its advantages.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
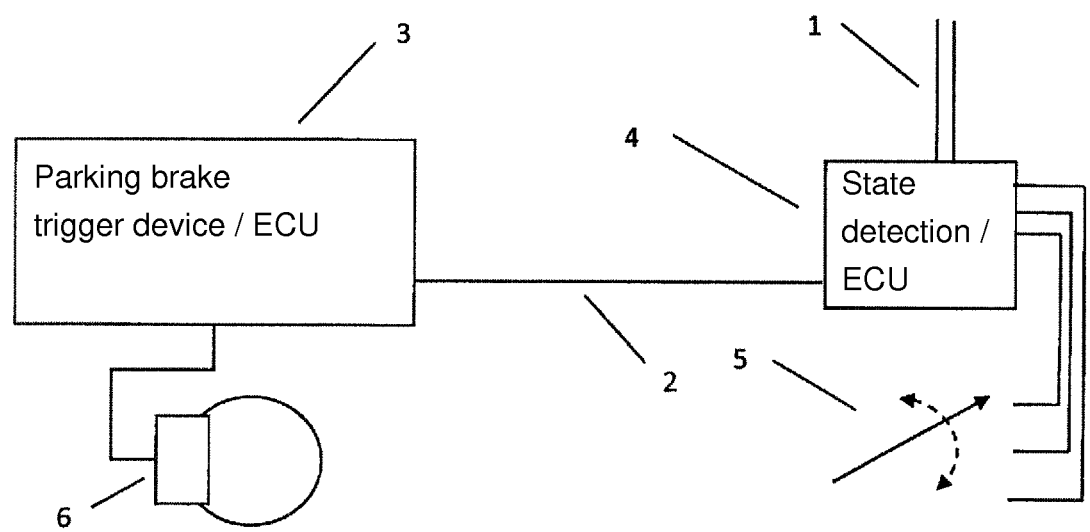
FIG. 1 is a schematic block diagram view of the construction of a system according to an embodiment of the invention.

In a system for operating a parking brake, FIG. 1 schematically illustrates a switching key 5 which can take up three states. The rest position of the switching key 5 may be the medium state, out of which the switching key 5 can be moved by being operated.

The system further comprises a detector 4 that detects the state of the switching key 5. The detector 4 is connected with the switching key 5 by way of lines and read out the state of the switching key by way of these lines. The detector 4 is spatially arranged close to the switching key 5, which permits comparatively short connection lines from the switching key 5 to the detector 4 of a length of, for example, 1 cm, 2 cm, 8 cm, or maximally 10 cm. Furthermore, the detector 4 that detects the state is connected by way of a single-wire line with a device 3 for triggering a parking brake 6. This connection may extend over a comparatively larger distance, such as more than 15 cm, for example, 15 cm, 30 cm, 50 cm, 1 meter or up to 2 meters. The connection comprises a line 2 for the transmission of messages, therefore for the transmission of data. Finally, the detector 4 is also connected by way of two lines 1 with a power supply (not shown) which, as required, may also be comparatively farther away. The detector 4 that detects the state of the switching key 5 is therefore connected only with a total of three comparatively longer lines.

The device 3 for triggering a parking brake 6 is connected with the parking brake 6 by way of one or more lines. As required, the parking brake 6 may include additional control devices. The device 3 is connected with the power supply and, as required, with further electronic devices.

Figure 2:
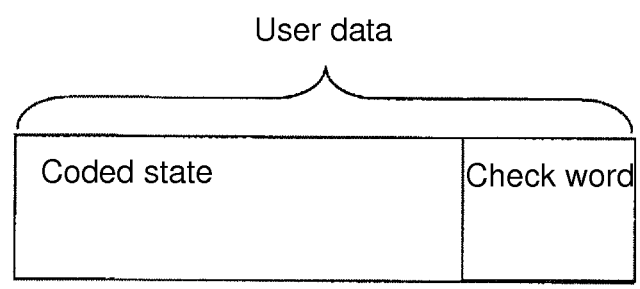
FIG. 2 is a schematic view of the construction of a message according to an embodiment of the invention.

The device 3 as well as the detector 4 transmit messages according to the LIN protocol, the device 3 taking over the role of the master. The device 3 for determining the state of the switching key 5 therefore sends a query to the detector 4 by way of the line 2. Upon receiving the query, the detector 4 reads out the state of the switching key 5 and, via a processor (ECU) codes this state; for example, "1" for the lowest position of the switching key, "2" for the medium position of the switching key, etc. A check word will then be determined by the detector 4 for this coded state by use of a cyclic redundancy check method. The coded state, as well as the check word, are then sent as user data of a message according to the LIN protocol to the device 3 by way of the single-wire line 2. FIG. 2 illustrates an example of the construction of user data which are transmitted by way of the LIN. The user data comprise the coded state and the check word.

The device 3 receives the message and checks by means of the check word and the cyclic redundancy check method whether faults have occurred in the transmission. If the device 3 determines that no fault has occurred, it will output an electric signal to the parking brake 6, which is based on the received coded state in order to implement the operating action of the switching key 5 by the user. Depending on which state the parking brake 6 then takes up, a corresponding status display (LED) can be activated in the switching key 5. When the parking brake 6 is activated, a status LED of the switching key 5 can be activated. This takes place by the sending of a message with the corresponding command by the device 3 to the detector 4, which correspondingly trigger the status LED.

However, if the device 3 determines that the transmission is faulty, the device 3 will write a fault report with additional data, such as the time of day, the date and/or received data, into a fault memory contained in the device 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a parking brake of a vehicle, wherein the parking brake is operated via a switching key activatable by a driver, the switching key being configured to take up at least two states, wherein the method comprises the acts of:
    detecting a state of the switching key via a switching key status detector;
    coding the detected state of the switching key;
    generating a check word for the coded detected state by use of a cyclic redundancy check;
    creating, in response to a query from a parking brake controller coupled with a parking brake trigger device, a message suitable for transmission via a single-wire channel, the message comprising the coded detected state and the generated check word; and
    transmitting the message to the parking brake controller from a switching key detector controller coupled with the switching key status detector by way of the single-wire channel.

2. The method according to claim 1, wherein the message is created for the transmission based on a Local Interconnect Network (LIN) specification, the check word being transmitted in user data of the created message.

3. The method according to claim 1, wherein the switching key is configured to take up three different states.

4. The method according to claim 1, wherein the parking brake controller triggers the parking brake of the vehicle.

5. A method for triggering a parking brake of a vehicle according to an operation of a switching key activatable by a driver of the vehicle, the switching key being configured to take-up at least two states, the method comprising the acts of:
    sending, via a single-wire channel, a query concerning a state of the switching key to a switching key detector controller coupled with a switching key status detector;
    receiving from the switching key detector controller, by way of the single-wire channel, a message that is generated in response to the query and contains a check word and a coded state of the switching key, the check word being created by use of a cyclic redundancy check;
    checking, at the receiving end of the message, the coded state for transmission faults by way of the check word according to the cyclic redundancy check; and
    if no transmission faults are detected, outputting an instruction to activate the parking brake if the coded state of the switching key indicates that the parking brake is to be activated.

6. The method according to claim 5, wherein the message is created based on a Local Interconnect Network (LIN) specification, and further wherein the check word is included in user data of the message.

7. The method according to claim 6, further comprising the act of:
    writing a fault report into a fault memory if the check detects a transmission fault.

8. The method according to claim 6, further comprising the acts of:
    sending two queries concerning the state of the switching key to the switching key detector controller, wherein a first time period exists between the two queries during which receipt of a responsive message to a first of the queries is expected;
    determining that no responsive message was received to the switching key detector controller in the first time period between the two queries, as well as in a second time period after the second query in which the receipt of a responsive message is to be expected when no expected response was detected during the first and second time periods; and
    in response to the determination that no message was received, writing a corresponding fault report into a fault memory.

9. The method according to claim 5, further comprising the act of:
    writing a fault report into a fault memory if the check detects a transmission fault.

10. The method according to claim 5, further comprising the acts of:
    sending two queries concerning the state of the switching key to the switching key detector controller, wherein a first time period exists between the two queries during which receipt of a responsive message to a first of the queries is expected;
    determining that no responsive message was received from the switching key detector controller in the first time period between the two queries, as well as in a second time period after the second query in which the receipt of a responsive message is to be expected when no expected response was detected during the first and second time periods; and
    in response to the determination that no message was received, writing a corresponding fault report into a fault memory.

11. A device for operating a parking brake by a driver of a vehicle, comprising:
    a switching key configured to take-up at least two states;
    a switching key status detector configured to detect a state of the switching key; and
    a switching key detector controller coupled with the switching key status detector and being configured to execute a program to:
        receive a query from a parking brake controller coupled with a parking brake trigger device concerning a state of the switching key;
        detect a state of the switching key;
        code the detected state of the switching key;
        generate a check word for the coded detected state by use of a cyclic redundancy check;
        create, in response to the query, a message suitable for transmission via a single-wire channel, the message comprising the coded detected state and the generated check word; and
        transmit the message to the parking brake controller by way of the single-wire channel.

12. The device according to claim 11, wherein
the switching key detector controller has a partial switching-off mode, and
the switching key detector controller remains in the partial switching-off mode until the switching key detector controller receives the query.

13. A device for triggering a parking brake of a vehicle according to an operation of a switching key by a driver of a vehicle, the switching key being configured to take-up at least two states, comprising:
a parking brake trigger device configured to receive a message via a single-wire channel;
a fault memory; and
a parking brake controller coupled with the parking brake trigger device and being configured to execute a program to:
send, via the single-wire channel, a query concerning a state of the switching key to a switching key detector controller coupled with a switching key status detector;
receive from the switching key detector controller, by way of the single-wire channel, a message that is generated in response to the query and contains a check word and a coded state of the switching key, the check word being created by use of a cyclic redundancy check;
check, at the receiving end of the message, the coded state for transmission faults by way of the check word according to the cyclic redundancy check; and
if no transmission faults are detected, output an instruction to activate the parking brake if the coded state of the switching key indicates that the parking brake is to be activated.

* * * * *